United States Patent [19]

Martin, Jr.

[11] 4,392,669
[45] Jul. 12, 1983

[54] CAB FOR LIFT TRUCK WITH SWING OUT WINDSHIELD

[76] Inventor: Robert P. Martin, Jr., 12576 Lake Ave., Lakewood, Ohio 44107

[21] Appl. No.: 200,333

[22] Filed: Oct. 24, 1980

[51] Int. Cl.³ .............................................. B62D 1/18
[52] U.S. Cl. .................................. 280/775; 180/89.12; 187/9 R; 296/190; 296/201
[58] Field of Search ....................... 296/190, 201, 146; 180/89.12, 89.13; 187/9 R; 280/756, 775

[56] References Cited

U.S. PATENT DOCUMENTS

| | | | |
|---|---|---|---|
| 4,007,958 | 2/1977 | Peifer | 296/190 |
| 4,114,719 | 9/1978 | Saunders | 280/775 |
| 4,116,483 | 9/1978 | Kramer | 296/190 |
| 4,133,574 | 1/1979 | Martin | 296/190 |
| 4,144,614 | 3/1979 | Barbee | 296/190 |
| 4,184,712 | 1/1980 | Skahill | 296/190 |

Primary Examiner—Joseph F. Peters, Jr.
Assistant Examiner—John A. Carroll
Attorney, Agent, or Firm—Pearne, Gordon, Session, McCoy, Granger & Tilberry

[57] ABSTRACT

A cab for an electric lift truck having a displaceable steering wheel for battery access. A front panel of the cab is hinged in a manner which allows it to temporarily swing out of the path of the steering wheel while avoiding interference with the lift mast. A windshield wiper unit carried on a fixed area of the cab is automatically deflected by movement of the front panel. Various doors and panels of the cab are lap mounted over vertical corner post elements to permit limited adjustment of their relative spacing for proper fitting with a production lift truck.

9 Claims, 9 Drawing Figures

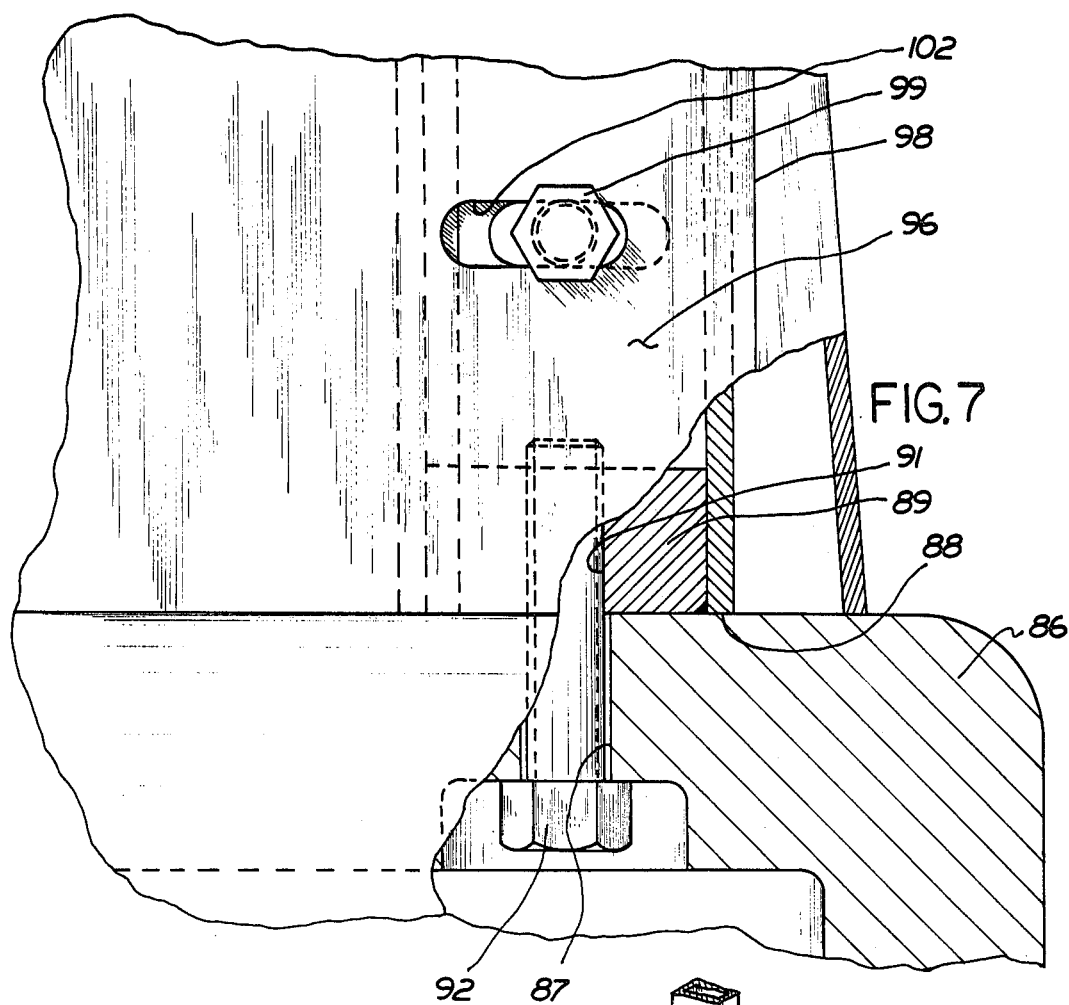
FIG. 7
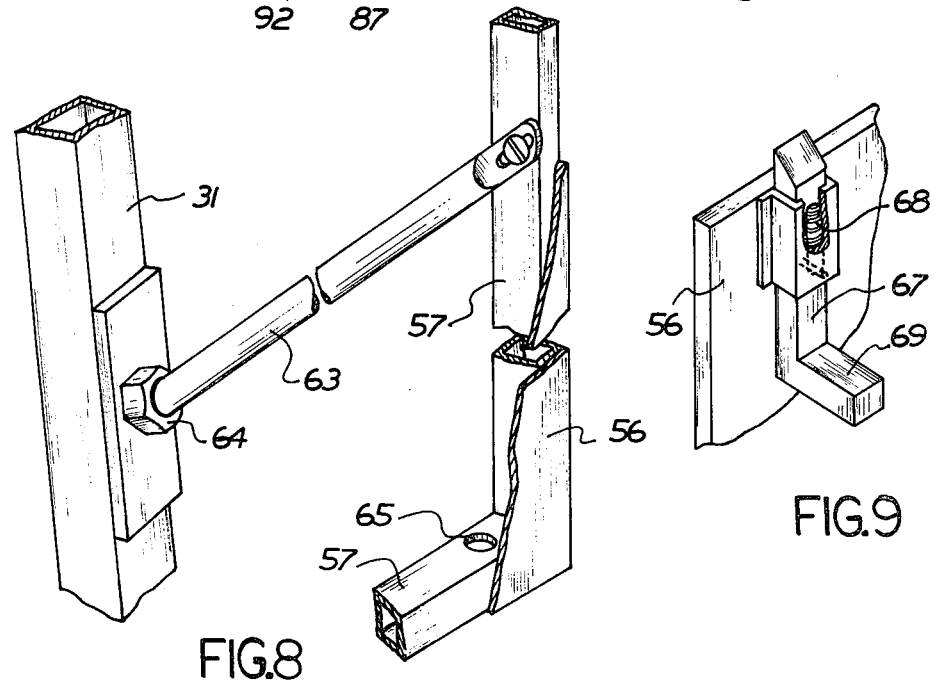
FIG. 8
FIG. 9

CAB FOR LIFT TRUCK WITH SWING OUT WINDSHIELD

BACKGROUND OF THE INVENTION

The invention relates to industrial lift trucks, and in particular to an improved cab enclosure for an electric lift truck.

Prior Art

Industrial electric lift trucks of current conventional design are powered by storage batteries that are relatively heavy and bulky. These storage batteries are often removed and replaced from the truck for service, recharge, and the like. It is customary to remove storage batteries from a truck by raising them vertically off the truck chassis with an overhead hoist. Because of battery bulk and weight, special provisions are often incorporated in lift trucks to facilitate battery removal. In certain truck designs, for example, the steering wheel may be arranged to tilt forwardly out of its normal operational position to provide clearance for battery removal and replacement.

When it is desired to enclose the truck with a cab including a full windshield, a problem of interference between the steering wheel and the windshield may be encountered where the steering wheel is caused to be displaced into its battery clearance position. This problem is not easily avoided where the lift mast of the vehicle is immediately adjacent the steering wheel clearance position and thereby limits positional freedom of the windshield.

SUMMARY OF THE INVENTION

The invention provides a cab enclosure having a windshield mounting arrangement particularly suited for use with an electric lift truck incorporating a steering wheel which is forwardly displaceable for battery access. The disclosed windshield mounting arrangement satisfies the conflicting restraints imposed by the steering wheel on the one side and the lift mast on the other side.

In the disclosed arrangement, the cab includes a space frame comprised of four generally vertical uprights or corner posts tied together at their upper ends by suitable horizontal elements or headers forming a rectangle at the perimeter of the top of the cab. A front panel of the cab extending over the zone between the front set of corner posts includes a windshield that encompasses a major portion of its area. The front panel is pivoted about a generally vertical axis at a corner post on a side of the cab most distant from the steering wheel. As a result of the spatial interrelationships of the front panel hinge, the steering wheel, and the mast, satisfactory clearance for the steering wheel to assume its retracted or clearance position is provided. At the same time, direct interference with the mast is avoided even though points on the front panel remote from the hinge axis may pass through a plane defined by the mast. As a benefit of these geometrical relationships, the front panel may be displaced to its open position for steering wheel clearance without undue regard for the tilt angle of the mast. As described herein, a windshield wiper motor and blade assembly serving the windshield are mounted on a fixed cowl beneath the movable front panel. The position of the motor relative to the front panel hinge axis and construction of the wiper arm allow the front panel to be opened without separate attention and independent manipulation to the wiper motor and arm. The disclosed fixed wiper motor mounting arrangement avoids wiring problems by permitting wiring to be fully tied down without free loops and completely avoids obstruction of overhead vision.

The illustrated cab, moreover, is compatible with truck chassis designs requiring adjustment in the relative spacing of the corner posts. As disclosed, the posts are adapted to be adjusted, with directional reference to the chassis, laterally and/or longitudinally relative to one another to suit the requirements of a particular chassis. Side doors, as well as the front panel, are lap-hung on their respective corner posts so that limited spreading of the respective corner posts does not significantly affect the fit of their closures. As disclosed, the rear panel is mounted on the frame structure in such a manner that it allows lateral adjustment of the spacing of the rear posts for installation purposes.

BRIEF DESCRIPTION OF THE DRAWINGS

FIG. 7 is a rear elevational view on an enlarged scale of portions of the cab and truck, with portions broken away to reveal structural details.

FIG. 8 is an enlarged, perspective view of sections of the front panel and an associated corner post of the cab illustrating details of a rod for propping the front panel open.

FIG. 9 is a fragmentary, perspective view of portions of the front panel and associated latch bolt.

DESCRIPTION OF THE PREFERRED EMBODIMENT

Figure 1:
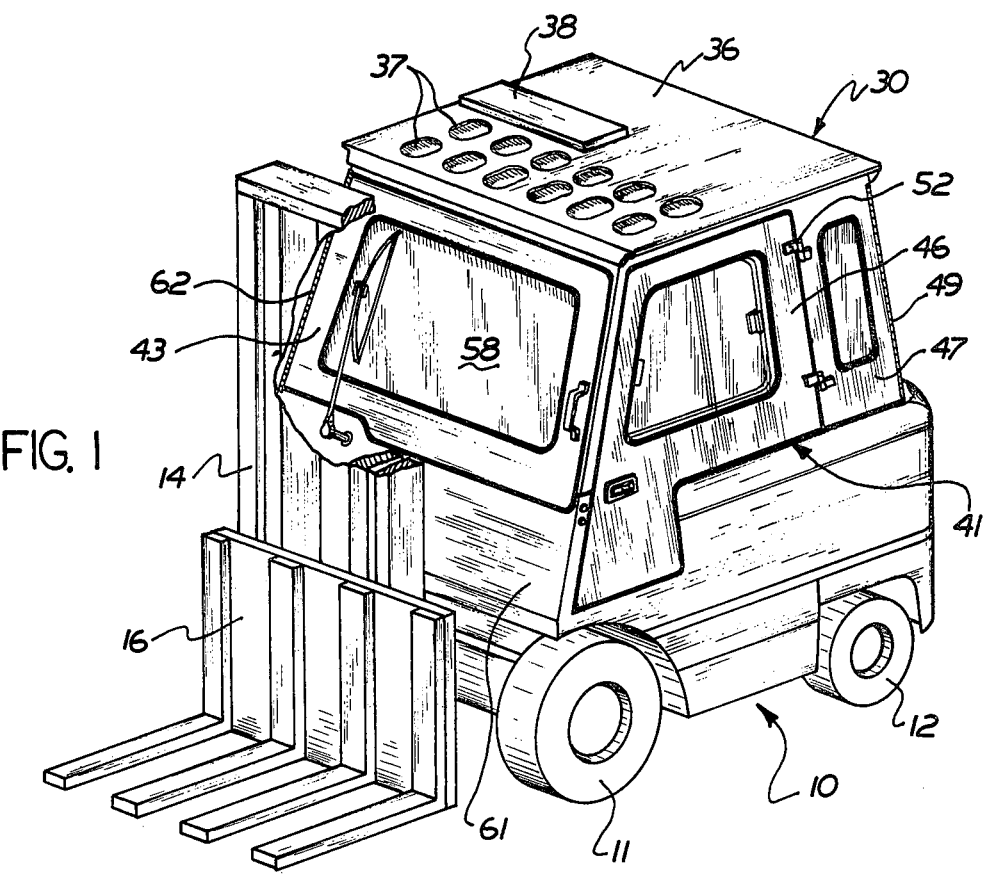
FIG. 1 is a perspective view of a lift truck and cab enclosure constructed in accordance with the invention.
Figure 3:
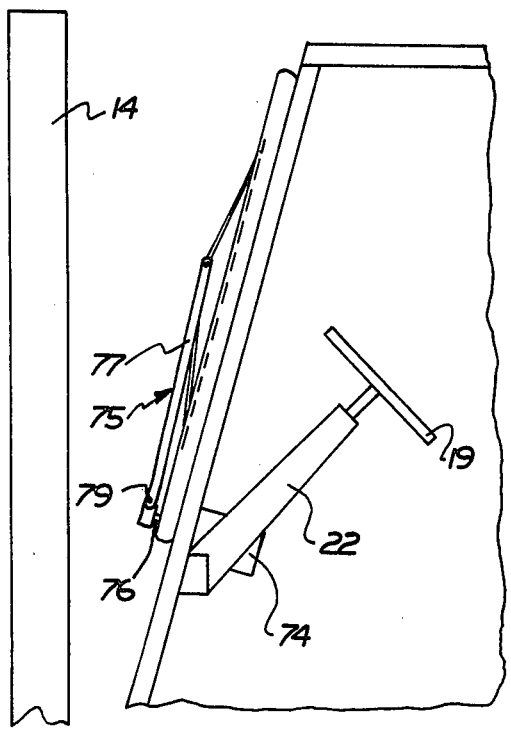
FIG. 3 is a schematic side view of portions of the cab and lift truck illustrating the steering wheel in its normal operational position.
Figure 4:
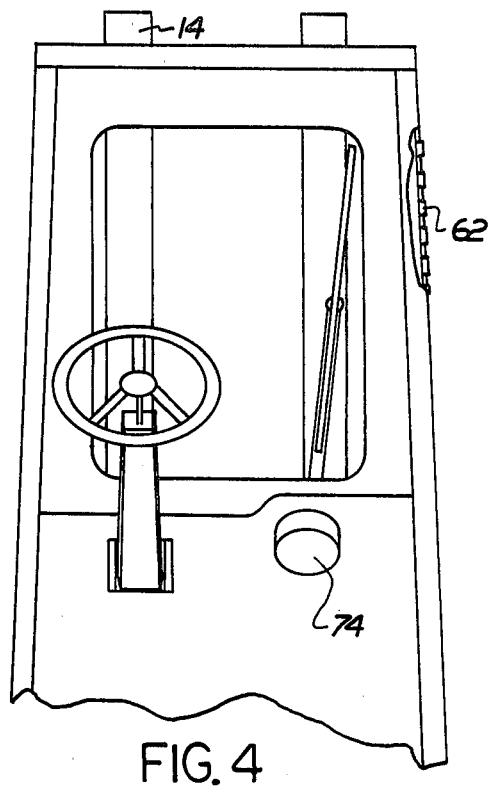
FIG. 4 is a schematic interior view of portions of the front panel of the cab and the lift truck.

There is illustrated in FIG. 1 an industrial lift truck 10 of generally conventional construction, including a chassis supported on wheels 11,12 and a power lift mechanism 13. The vehicle 10 is propelled and the lift mechanism 13 is operated by storage batteries (not shown) carried in a generally conventional manner within the chassis. The lift mechanism 13 includes a mast assembly 14 on which a fork carriage 16 is vertically guided. Within reach of an operator's station generally surrounding an operator seat 17 are controls for vertically positioning the carriage 16 on the mast assembly 14 and tilting the mast forward and backward a limited degree from the vertical, in accordance with generally conventional practice. A steering wheel 19, forward of the operator's seat 17, operates a pair of rear wheels 12 (only one is shown in FIG. 1). The steering wheel 19 and a column 22 supporting the steering wheel are pivotal between a normal operational position, indicated most clearly in FIG. 3, and a retracted position, indicated in FIG. 5, to provide clearance for removal and replacement of the batteries from the truck chassis. The structure for pivotally supporting the steering column 22 and wheel 19 is known in the prior art and forms no part of the present invention.

For purposes of protecting the operator from exposure to the environment in which the truck 10 operates, the truck is fitted with a cab enclosure 30. The cab 30 includes a space frame or network of elongated structural elements comprising a set of generally vertical corner posts 31,32 and a set of four generally horizontal header elements 34. The corner posts 31,32 and header elements 34 may be fabricated of rectangular steel tubing joined by welding or certain elements may be integral and bent into the desired configuration. A steel plate 36 at the horizontal top face of the cab 30 is welded on the headers 34 and provides protection for the operator against falling objects, as well from the environment. The plate 36 may be provided with slots 37 for purposes of overhead vision, and such slots may be covered with a transparent medium, such as acrylic or polycarbonate sheet stock suitably secured on the upper face of the plate 36. A steel door 38 suitably hinged on the top face of the steel plate 36 provides access to a slot 39 cut into the roof plate. When the door 38 is opened, strands of cable, chain or the like of an overhead hoist may be operated through the slot 39 to vertically hoist the storage batteries from the truck chassis. The horizontal header 34 on the side of the roof plate 36 associated with the slot 39 is sectioned at the slot to provide horizontal passage therethrough.

The generally vertical faces of the cab 30 comprise side door panels 41, a rear panel 42, and a front panel 43. In the illustrated case, the side door panels 41 are of a bifold type having separate, generally linear folding sections 46,47. The rearward or port section 47 of each side is pivoted on a continuous hinge 49 fixed to an associated rear corner post 32. The forward door section 46 is pivoted to the port section 47 on pin hinges 52. The port door sections 47 are latched closed to the cab by conventional springloaded catches of conventional construction, and the forward or main door sections 46 are latched by commercially available paddle handle latches 54 carried on the door sections to tabs 53 welded to associated front corner posts 31. The bifold side panel construction enables an operator to open only the forward main door section 46 for his passage and permits full access to the cab interior for battery removal and other service when both panels 42,43 are opened. Each section 42,43 is fabricated from sheet metal material, and includes a window of safety glass or other suitable material carried in elastomeric glass mounting extrusions known in the art. The perimeters of the side door panels are fitted with conventional balloon-type elastomeric seals to form a relatively weathertight seal with adjacent surfaces of the cab 30 or truck 10.

Figure 5:
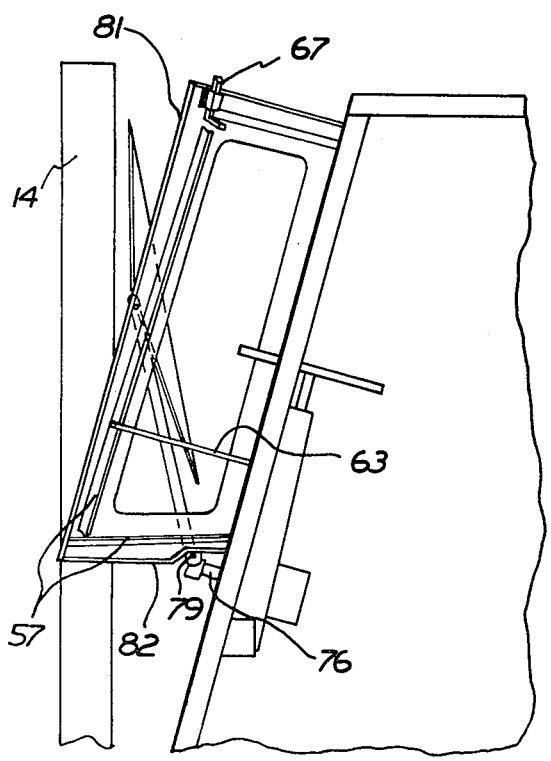
FIG. 5 is a schematic side view similar to FIG. 3, illustrating the front panel of the cab in an open position and the steering wheel in a retracted position.

The front panel 43 is a generally planar structure comprising a frame 56 fabricated of sheet steel and suitable stiffening members 57 and a windshield 58 of safety glass or other transparent sheet material. The windshield 58 is mounted, like the side lights, in elastomeric extrusions. As illustrated, the windshield 58 comprises the majority of the area of the front panel 43 to provide a high degree of forward visibility for the operator. As indicated in FIG. 5, when the steering wheel 19 is manually shifted to its retracted position, it passes forward through the plane normally occupied by the front cab panel 43. To permit movement of the steering wheel 19, the front panel 43 is movably mounted on the cab to enable it to be shifted forwardly of its normal closed position lapped on the front corner posts 31, associated header 34, and a cowl plate 61. The mounting arrangement affording this front panel movement includes a continuous hinge 62 interposed between the front panel 43 and an associated corner post 31. The hinge 62 provides a pivot axis for the front panel 43 which is substantially vertical, although it is ideally slightly canted to the rear, for example, being parallel to the associated corner posts 31. The slight rearward cant of the hinge axis causes the front panel 43 to be biased by the force of gravity to its closed position where it abuts and seals with the front corner posts 31, adjacent header 34, and cowl plate 61. A rod 63 is provided to maintain the front panel 43 in its open position. The rod 63 is pivotally affixed to a stiffening channel 57 of the front panel frame 56 by a bolt extending through the channel and a slot in the upper end of the rod. When propping the front panel 43 in its open position, the lower end of the rod 63 is positioned in a blind hole formed in a boss 64 welded to the adjacent front corner post 31 (FIG. 8). In the storage position of the rod 63, its lower end is disposed in a hole 65 in a lower stiffening channel 57 of the front panel frame 56.

In its closed position, the front panel 43 is latched by a bolt 67 biased by a spring 68 into a hole formed in the adjacent header 34 (FIG. 9). The latch bolt 67 is manually operated by depressing the bolt through a finger grip extension 69. A handle 71 bolted to the front side of the front panel 43 adjacent the edge opposite the hinge 62 facilitates opening and closing of this panel.

The cowl plate 61 underlying the front panel 43 is a generally planar steel plate which is affixed to the front corner posts 31 by bolts or other suitable means. On a side of the cowl 61 adjacent the front panel hinge 62 is a wiper motor unit 74 and blade assembly 75. The wiper motor 74 is a typical design of commercially available units incorporating an electric motor and having an oscillating output shaft 76 (FIG. 5). The wiper unit 74 is fixed to the cowl 61 with screws or other suitable means. The blade assembly 75 is also a typical design of commercially available units having an arm with its lower end mounted on the free end of the output shaft 76 and a wiper blade 78 carried on its opposite free end. In accordance with conventional practice, the wiper arm 77 has a knee or clevis joint 79 above the motor shaft 76 but below the lower edge of the adjacent area of the front panel 43, and includes a spring (not shown) biasing the arm 77 about the joint 79 towards the windshield 58. The axis of the joint 79 is perpendicular to the shaft 76 and generally parallel to the front panel 43.

Figure 2:
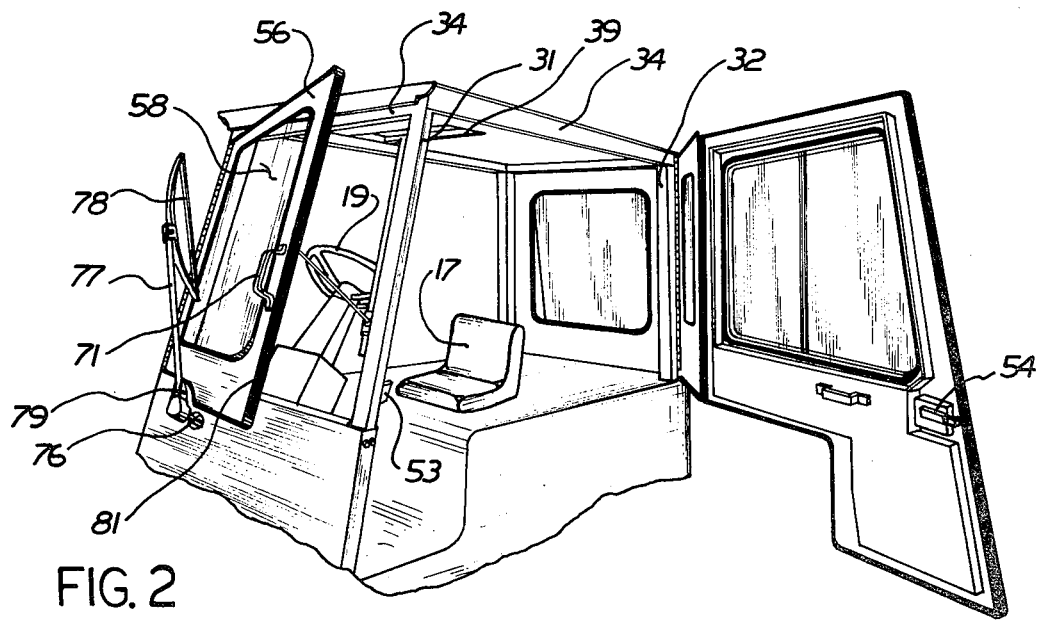
FIG. 2 is a perspective view of the cab illustrated with front and side panels in open positions.

When it is desired to retract the steering wheel 19 for battery access, it is first necessary to open the front panel 43 to its clearance position. It will be understood from the foregoing description that this is accomplished by manually depressing the finger grip 69 to release the latch bolt 67 on the front panel 43 and thereafter urging the front panel forwardly until it assumes the position of FIGS. 2 and 5. The lower end of the prop rod 63 is removed from the retaining hole 65 and is inserted into the corner post boss 64. The length of the rod 63 is such that it holds the front panel in a position where its area immediately adjacent to the steering wheel 19 is forward of the extreme forward position of the steering wheel when the latter is fully retracted. Since the axis of the hinge 62 is at the side of the cab furthest from the steering wheel, there is only a limited degree of forward overtravel of the free side edge 81 of the front panel 43 opposite this hinge 62, so that the potential for interference of this free side edge with the mast is reduced. As indicated in FIG. 5, the front panel and hinge interrelationship with the mast 14 allows this free edge 81 to pass through the plane of the mast without obstruction. since it does so at points laterally outside of the lateral extent of the mast. Thus, the geometry of the front panel hinge reduces problems of interference with the mast and requires less restriction on the tilt of the mast 14 when it is desired to open the front panel 43.

From the drawings, it will be understood that the wiper arm 77 is automatically caused to withdraw with opening movement of the front panel 43. A lower edge 82 of the front panel 43 engages directly with the arm 77 and causes the latter to pivot on its knee joint 79. The requisite deflection of the arm 77 is reduced by the strategic location of the wiper motor shaft 76 adjacent the side of the cab at which the front panel hinge 62 is located. That is, at the locus of contact between the wiper arm 77 and the lower edge 82 of the front panel 43, there is only a relatively small amount of movement of the lower edge as compared to the degree of movement, for example, of the front panel near the steering wheel 19. As a result of the fixed location of the wiper motor 74 on the fixed cowl 61, the electrical wiring to this unit is simplified, since the wiring can be fixed directly to the cowl plate 61 without free loops which might otherwise be required where the motor unit was mounted to the movable front panel 43. Still further, the location of the wiper motor in the lower area of the cab avoids obstruction of vision at the upper regions of the windshield 58 or slots 37.

As discussed above, the side door panels 41 and front panel 43 are hung in such a manner that they lap over the associated corner posts 31,32 and headers 34. During the manufacture of the chassis of the truck 10, mounting points are ordinarily provided for securing the corner posts 31,32 or their equivalents to the chassis. Where such mounting points comprise preformed holes for reception of bolts to be threaded onto the corner posts 31,32 or extensions thereof, it may occur during production of the truck that such mounting holes vary in position within a range of tolerance which is expected to be taken up by provisions on the corner posts 31,32 or their equivalents. FIG. 7 illustrates one manner in which a rear corner post 32 may be fastened to a casting 86 comprising a part of the chassis of the vehicle 10. The casting 86 is provided with a generally vertical mounting hole 87. The cab 30 is set on the truck 10 with a lower face 88 of a rear corner post 32 abutting a top surface of the casting. The corner post 32 has a steel block 89 welded or otherwise fixed within its lower end. The block is fabricated with an internally threaded, generally vertical hole 91. When the threaded hole 91 is aligned with the casting hole 87, a bolt 92 is inserted from beneath the casting and threaded into the block to affix the corner post to the casting. Because of manufacturing tolerances in either the truck 10 or cab 30, it may be necessary to spread the individual corner posts 31,32 relative to one another longitudinally and/or laterally of the truck to make the respective casting holes align with the corner post threaded holes 91. Since the side door panels 41 and front panel 43 are lapped over these corner posts 31,32 they pose no restriction to such limited movement of the corner posts.

Figure 6:
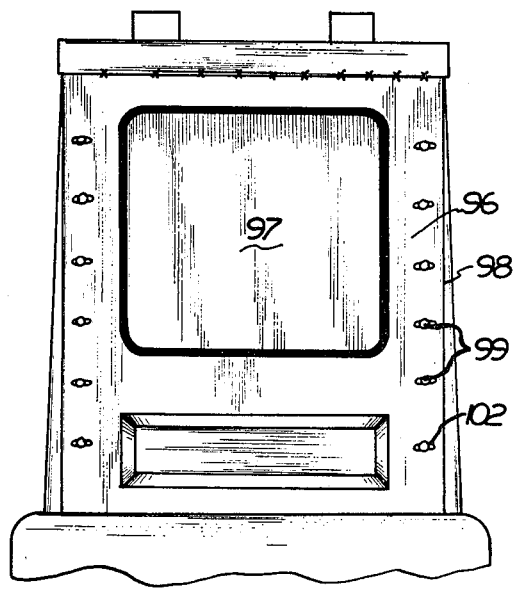
FIG. 6 is a rear elevational view of portions of the cab.

With reference to FIGS. 6 and 7, there is provided a rear cab panel 96 having a light 97 in its central region. The light or rear windshield 97, like the side lights, is formed of safety glass or other transparent sheet material mounted in a rubber extruded gasket. As illustrated in FIG. 6, the rear panel 96 is affixed to the roof plate 36 or adjacent header 34 by welding or the like across its horizontal upper edge. The vertical edges 98 of the rear panel 96 are adjustably secured to associated rear corner posts 32 by bolts 99 disposed in horizontal slots punched or otherwise formed in the rear panel and threaded into the wall of the rear corner posts 32. The slots 102 are centered on the nominal center of the bolts 99 so that lateral or horizontal shifting of the rear corner posts 32 towards or away from one another to account for the actual production spacing of the casting holes 87 associated with these corner posts will be accommodated by the slots 102. Once the bolts 92 holding the corner posts 31,32 to the truck are tightened, the rear panel retaining bolts 99 can be fully tightened to draw the rear panel tight to the rear corner posts 32.

Although the preferred embodiment of this invention has been shown and described, it should be understood that various modifications and rearrangements of parts may be resorted to without departing from the scope of the invention as disclosed and claimed herein.

What is claimed is:

1. In combination a lift truck having a mast at its front end and a steering wheel disposed rearwardly of the mast and movably mounted for displacement along a path from a rearward operational position to a temporary forward clearance position, a cab having a structure for protecting a driver seated rearwardly of the operational position of the steering wheel, said cab structure including a forward face having a windshield, the forward face extending in a plane generally upright and from side to side of the truck, said forward cab face including a movable panel carrying said windshield, generally vertical hinge means on said cab structure supporting said movable panel for pivotal movement about a generally vertical axis between a normal position and an extended position, said movable panel in said normal position having a portion proximate to said steering wheel extending across said path and in said extended position having said proximate portion disposed forwardly of said steering wheel clearance position, whereby said steering wheel is free of obstruction by said panel in its movement from said operational position to said clearance position, the hinge means being so constructed and disposed to cause said movable panel to swing between said normal position and extended position without interference with the mast when the mast is in a generally vertical position.

2. The combination as set forth in claim 1, wherein said hinge means is disposed on a corner of said cab formed at the intersection of the forward face and a side face of said cab most distant from said steering wheel.

3. The combination as set forth in claim 2, wherein said hinge means pivot axis is canted slightly to the rear of the cab whereby said movable panel is biased by gravity from its extended position to its normal position.

4. The combination as set forth in claim 3, including means to releasably hold said movable panel in its extended position against the influence of gravity.

5. The combination as set forth in claim 4, including handle means on the exterior of the movable panel on an edge thereof opposite said hinge means.

6. The combination as set forth in claim 1, including a wiper unit mounted on a stationary area of said cab, said wiper unit including a wiper arm assembly for servicing said windshield and a motor for oscillating said arm, said wiper unit including pivot means allowing said arm to move in response to displacement of said movable panel into its extended position while said motor remains stationary.

7. The combination as set forth in claim 6, wherein said wiper unit is fixed on said cab structure adjacent said movable panel hinge means.

8. The combination as set forth in claim 7, wherein the cab structure includes a cowl at a lower edge of said movable panel, said wiper unit being mounted on said cowl, said wiper arm being arranged to extend generally upwardly from said cowl and over the exterior of said movable panel.

9. A cab for a lift truck having a mast at its front end and a steering wheel disposed rearwardly of the mast and movably mounted for displacement along a path from a rearward operational position to a temporary forward clearance position, the cab having a structure for protecting a driver seated rearwardly of the operational position of the steering wheel, said cab structure including a forward face having a windshield, the forward face extending geneally upright in a plane and from side to side of the truck, said forward cab face including a movable panel carrying said windshield, hinge means on said cab structure supporting said movable panel for pivotal movement between a normal position and an extended position, the pivot axis of said hinge means being generally vertical and being disposed at a front corner of the cab most distant from the steering wheel, said movable panel in said normal position having a portion proximate to said steering wheel extending across said path and in said extended position having said proximate portion disposed forwardly of said steering wheel clearance position whereby said steering wheel is free of obstruction by said panel in its movement from its operational position to its clearance position, the hinge means being so constructed and disposed to cause said panel to swing between said normal position and extended position without interference with said mast when the mast is in a generally vertical position, a windshield wiper unit fixed to a portion of said cab structure separate from said movable panel, said wiper unit including a wiper arm extending over said windshield when the movable panel is in its normal position, said wiper arm including a pivot center adjacent but outward of the path of said movable panel, and disposed laterally inwardly of the movable panel hinge axis, said pivot center permitting said wiper arm to deflect forwardly with said movable panel when said movable panel is moved to its clearance position.

* * * * *